United States Patent [19]

Cambio

[11] 4,172,534
[45] Oct. 30, 1979

[54] BLOW MOLDED THERMOPLASTIC CONTAINER HAVING A NEEDLE PUNCTURE SITE AND METHOD OF MAKING AND APPARATUS FOR MAKING SAME

[75] Inventor: Orlando D. Cambio, Bristol, Wis.

[73] Assignee: Respiratory Care, Inc., Arlington Heights, Ill.

[21] Appl. No.: 887,186

[22] Filed: Mar. 16, 1978

[51] Int. Cl.$^2$ ............................................. B65D 47/36
[52] U.S. Cl. .................................... 215/247; 215/1 C
[58] Field of Search ............... 215/247, 1 R, 1 C, 249, 215/316

[56] References Cited

U.S. PATENT DOCUMENTS

| | | | |
|---|---|---|---|
| 2,848,130 | 8/1958 | Jesnig | 215/247 |
| 3,092,278 | 6/1963 | Jarnhall | 215/247 |

FOREIGN PATENT DOCUMENTS

| | | | |
|---|---|---|---|
| 1061608 | 3/1967 | United Kingdom | 215/1 C |
| 1464597 | 2/1977 | United Kingdom | 215/247 |

Primary Examiner—Ro E. Hart
Attorney, Agent, or Firm—Eric P. Schellin

[57] ABSTRACT

Disclosed herein is a container of blow molded plastic material which may contain a hermetically sealed biological. Attached to its outer side is an elastomeric diaphragm, adapted for cooperative use with a hypodermic needle as a self-sealing puncture site for injection or aspiration. The diaphragm may be protected by a storage cover which can readily be snapped off when the container is to be used. Also disclosed is a method and an apparatus for making the just described container with diaphragm and storage cover, in the preferred embodiment, as an assembled device, in a blow mold operation in which the container body is blown to fit against and lock to the diaphragm and storage cover.

12 Claims, 13 Drawing Figures

FIG. 1.
FIG. 2.
FIG. 3.
FIG. 4.
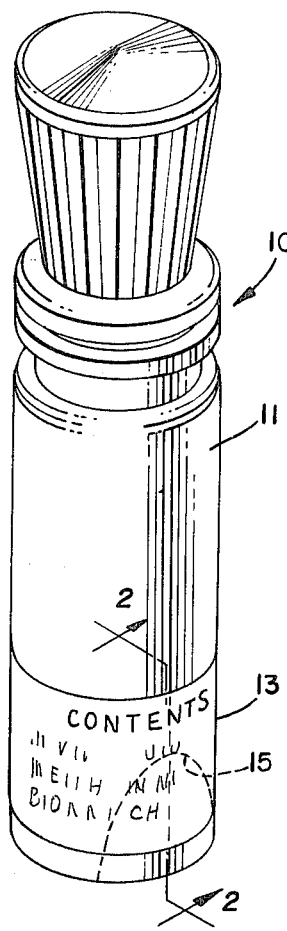
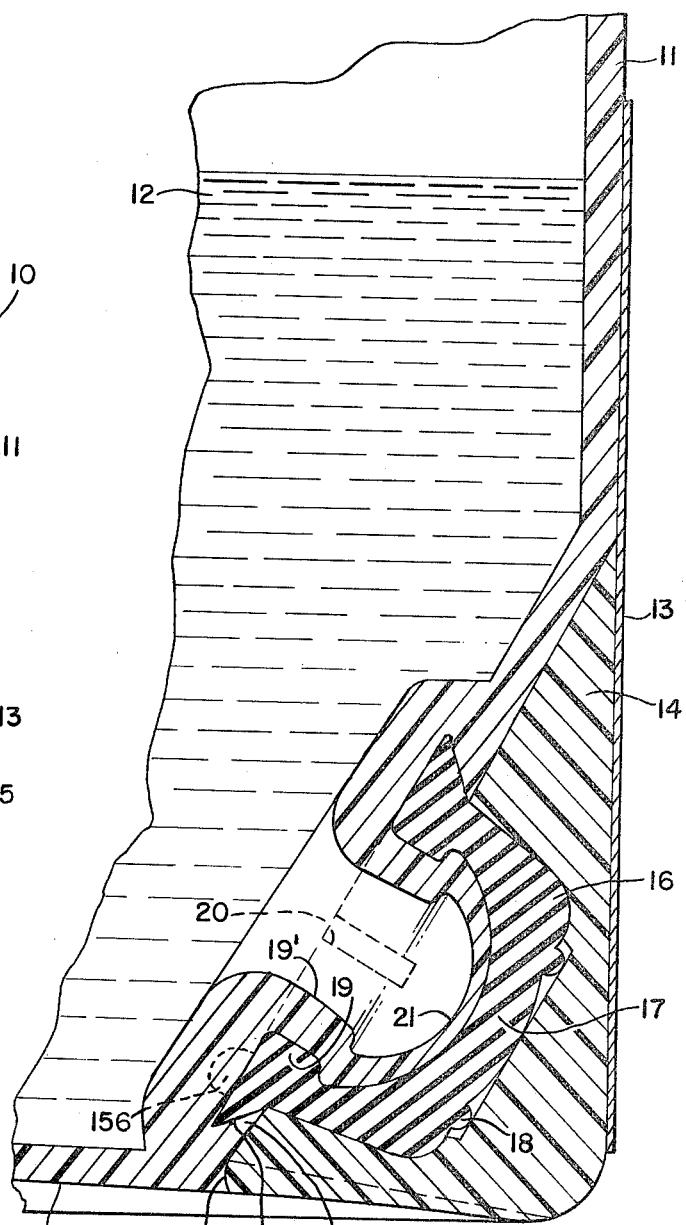
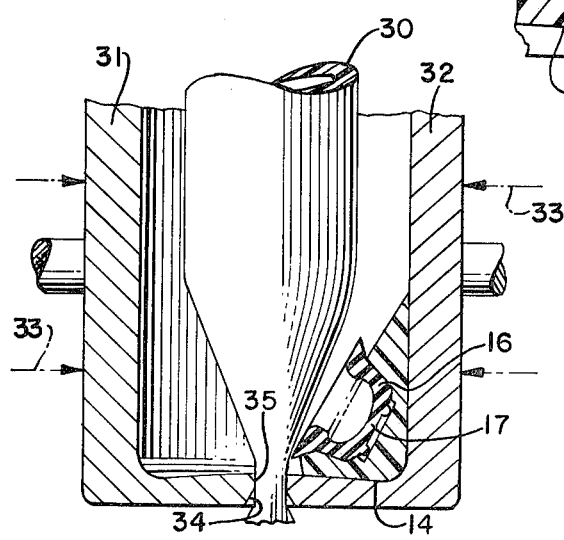
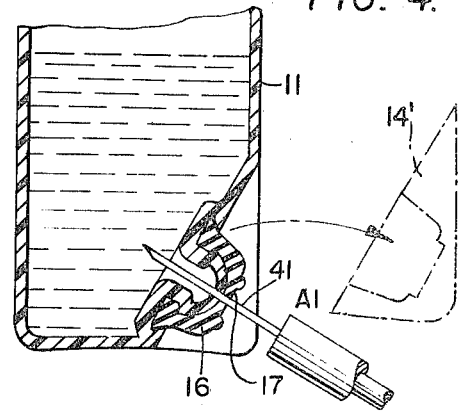

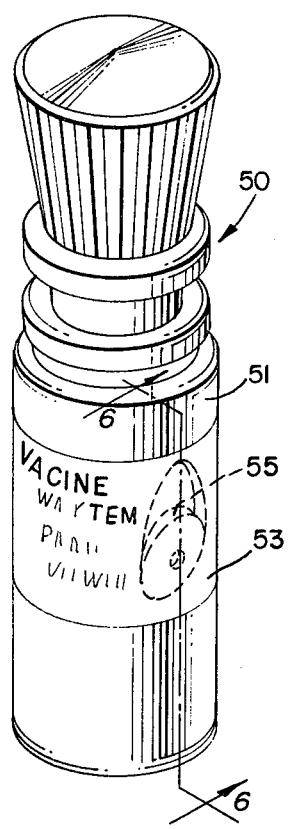
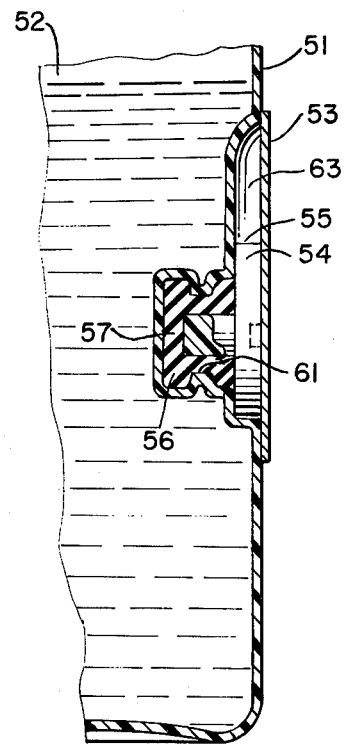
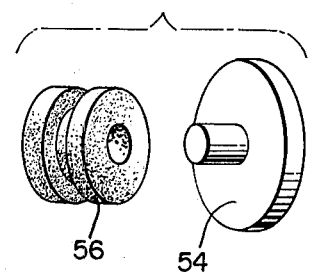
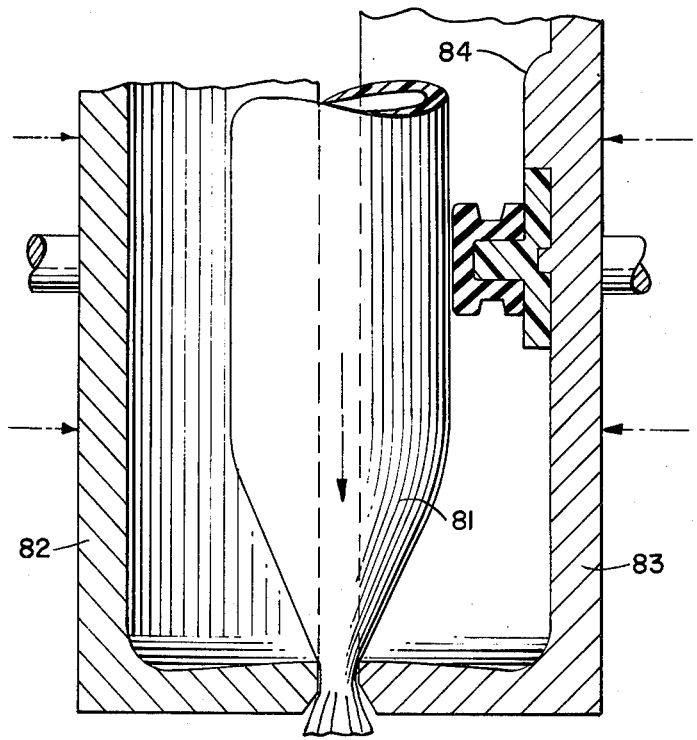
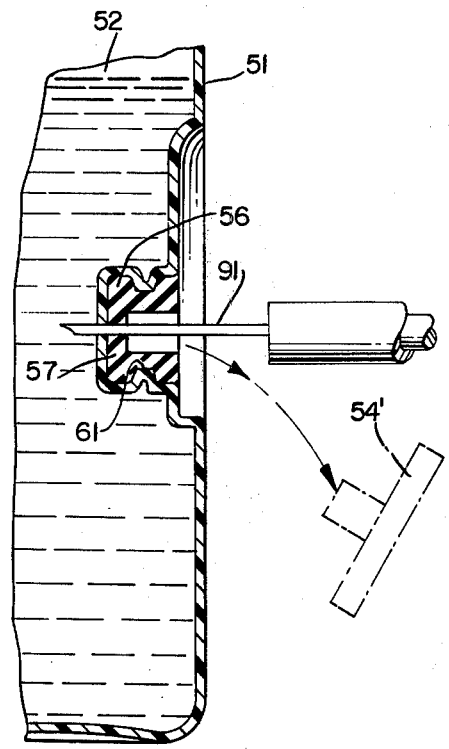

BLOW MOLDED THERMOPLASTIC CONTAINER HAVING A NEEDLE PUNCTURE SITE AND METHOD OF MAKING AND APPARATUS FOR MAKING SAME

BRIEF SUMMARY OF THE INVENTION

It is known in the prior art to blow mold a container having a breachable puncture site for injection or aspiration, which is protected by an integral sealed storage cover. It is contemplated that the container may have the shape and volume of an ampule. In use, the storage cover is broken away, exposing the sterile and breachable puncture site, through which the hypodermic needle is thrust to reach the liquid contents in the container. FIG. 13 of U.S. Pat. No. 3,851,029 discloses a container having a protected and breachable puncture site of the type just described.

One disadvantage of this prior art is that the breachable puncture site is useful for only a single puncture, since the plastic material does not reseal itself when the hypodermic needle is withdrawn, and because the site is difficult, after puncture to sterilize for a subsequent use.

The present invention solves this problem by the use of a container which is blow molded in a similar manner to that of the just described prior art, in which the puncture site is overlaid with and locked to a layer of self-sealing elastomeric material, so that the puncture site can be used a number of times in succession. Furthermore, the site is in the form of a projection, making it easier to resterilize with conventional techniques such as swabbing with alcohol.

Another problem that arises when puncturing some thicknesses of polyethylene is the fact that the needle may produce a core of polyethylene. Therefore, a preferred thickness of the polyethylene is less than 20 thousandths of an inch, but even so such a site will not seal.

In some containers of the prior art a rubber plug has been used as the injection site. While such a plug is readily self-sealable after being punctured, the use of such a rubber plug incurs other disadvantages. For instance in such prior art devices the contents in the container are in contact with the rubber plug. It has been found that the contents may become adulterated by the rubber plug especially if it contains leachable constituents.

In the present invention, in the preferred embodiment, the puncture site is protected by a storage cover which can readily be snapped off the container.

The elastomeric diaphragm and the storage cover are preassembled and may be presterilized and then inserted into a blow mold, in which the container is blown, may be filled and may be sealed. The operation of blowing the parison into the container configuration permanently locks the elastomeric diaphragm to the container, while the storage cover remains semipermanently adhered to the elastomeric diaphragm. In one embodiment it is contemplated that no storage cover be provided and secured after the blow molding operation.

BRIEF DESCRIPTION OF VIEWS OF DRAWING

FIG. 1 is a view of a preferred embodiment of the container of the present invention;

FIG. 2 is an enlarged cross sectional view of the injection or aspiration needle puncture site, along the plane 2—2 of FIG. 1;

FIG. 3 is a view showing an initial stage of the blow molding of the container;

FIG. 4 is a cross section showing the container in use with a hypodermic needle;

FIG. 5 is a view of another embodiment of the inventive container;

FIG. 6 is an enlarged cross section of the injection aspiration needle puncture site, along the plane 6—6 of FIG. 5;

FIG. 7 is an exploded view of the parts forming the injection-aspiration needle puncture site and the storage cover assembly;

FIG. 8 is a view showing the container of FIG. 5 in an initial stage of blow molding;

FIG. 9 is a cross section showing the container of FIG. 5 in use with a hypodermic needle;

DETAILED DESCRIPTION

Figure 10:
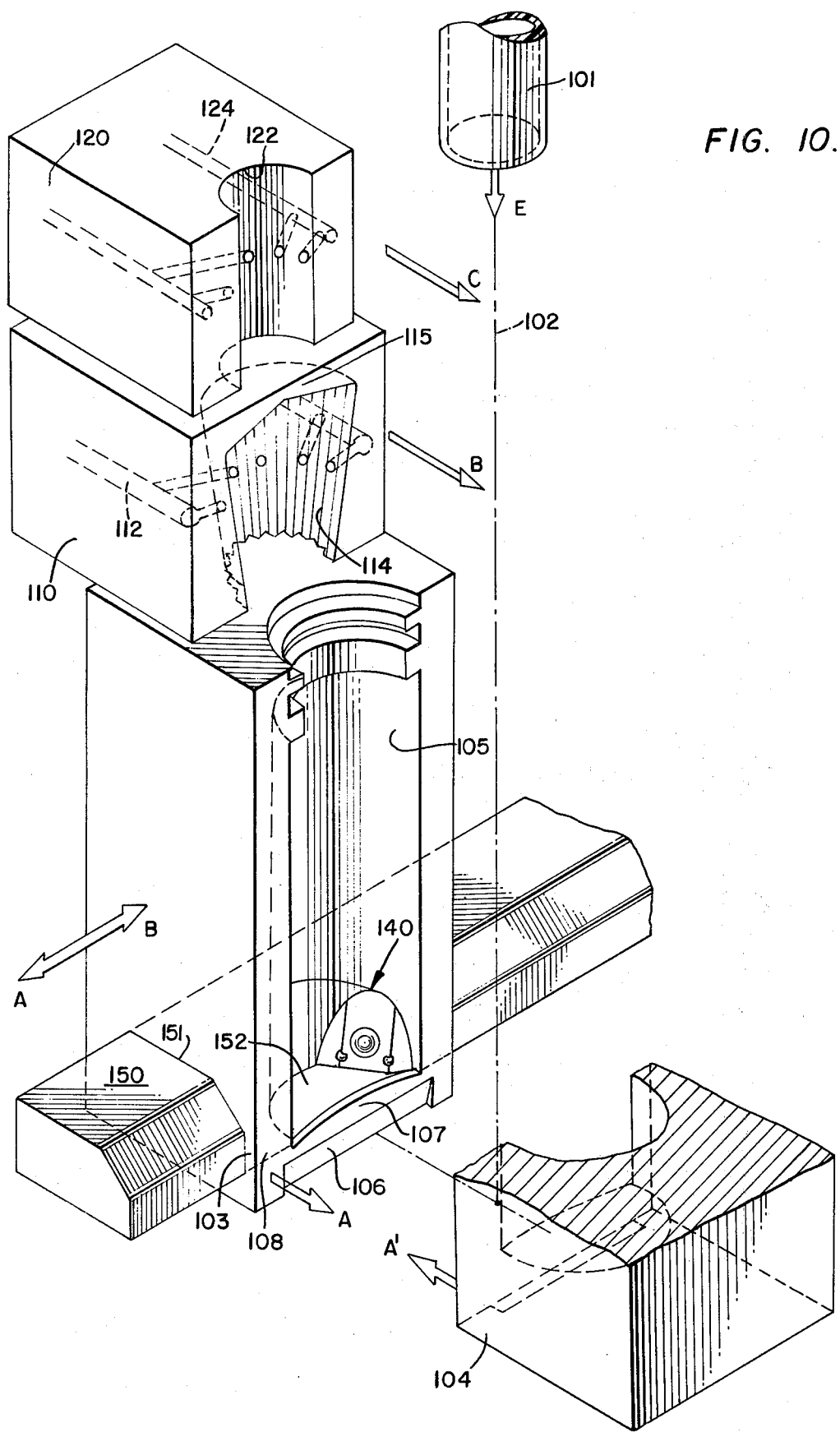
FIG. 10 is a partially exploded perspective view illustrating how the container of FIG. 1 is blow molded from a parison in the mold, with a needle puncture site assembly lying at a random orientation within the mold.

FIG. 1 shows a preferred embodiment of the container of the present invention wherein it is an ampule 10. The body 11 is covered by a label seal 13, which assists in securing the storage cover 14 (FIG. 2).

When the ampule 10 is to be used, the label-seal 13 is destroyed, permitting the user to pry up the edge 15 from the bottom to snap off the storage cover 14 to the position shown by 14' in FIG. 4, thereby exposing an elastomeric material such as a rubber seal 16. The rubber seal 16 fits very tightly within the recess in storage cover 14 and all parts had previously, during assembly, been sterilized. Accordingly, most of the contact area between rubber seal 16 and storage cover 14 will still be sterile at the time the label-seal 13 is broken. Such sterility may be in doubt for joining surfaces immediately adjacent to the ambient atmosphere, but the puncture-diaphragm area 17, within the defining ridge 18, is remote from the ambient atmosphere, and is sealed therefrom by the rubber seal 16 and will still be sterile when first exposed for use. Accordingly, a user can at that time insert a sterile hypodermic needle, as shown in FIG. 4, through the puncture-diaphragm area 17 and through the ampule body 11 into the interior, for aspiration of the contents 12 of the ampule or for injection of material. When the sterile needle 41 is withdrawn, all sterile parts of the ampule continue to remain sterile. The breached ampule body 11 does not seal itself but the overlying rubber seal 16 will seal itself.

The outside of the rubber seal, after a first use, cannot be expected to remain sterile, but it is protected from gross contamination by reapplication of the storage cover 14, which can be taped in place. For a second use, as is also true of prior art ampules, the surface of the rubber seal 16 is sterilized by various chemicals and the user, when inserting a sterile hypodermic needle, is careful to avoid the previous needle puncture site through the puncture-diaphragm area 17, since the sterilization may not have reached contamination which may have worked its way partway down the now closed-up traces of the previous puncture.

The rubber seal 16 is very strongly locked to the ampule body 11 and is frictionally releasably locked to the storage cover 14. This is achieved by the shape of the parts and by the process of making. The ampule body 11 is blow molded from a parison 30 (FIG. 3) of a semi-molten plastic such as polyethylene in split mold halves 31, 32. FIG. 3 shows the parison 30 in the process of being pinched off by narrow pinch-off area 35, having a pressure reducing relief 34, before the mold halves 31 and 32 close completely.

The needle puncture site assembly 140 (FIG. 11), consisting of storage cover 14 and rubber seal 16, has previously been placed in mold half 32. When the mold halves 31 and 32 close completely, the interior of the parison 30 is inflated by, for example, air or inert gas and blown out to fit the mold and the needle puncture site assembly 140.

The blow molding operation achieves the result shown in cross section in FIG. 2. It is seen that the ampule body 11 has been blown into the interior of rubber seal 16, forming a thinned-out locking bubble 21, which has a ridge 19' which locks on the undercut 19 of rubber seal 16.

The bottom of ampule 10 is not flat but has a hollow concave shape. There are two reasons for this. When the mold halves 31 and 32 close to pinch off the parison 30, some flash will inevitably remain. Such flash will cause less rocking of the ampule, set up on its bottom, if the central area of the bottom is recessed. The conical bottom shape of the mold halves 31 and 32 also assists in locating the needle puncture site assembly 140 in the mold, as will later become apparent in the discussion of FIG. 10. Of course, other locator means may be utilized.

From the method of making, it will be seen that the rubber seal 16 is in a state of somewhat of a compression before the storage cover 14 is removed for the first use. Thus, the puncture diaphragm area 17 will be hermetically sealed from the environment until the storage cover 14 is snapped off for the first use.

FIG. 5 shows another embodiment of the ampule. The ampule body 51 is blown in mold halves 82 and 83 from a parison 81 (FIG. 8) against a rubber seal 56 (FIGS. 6 and 7) to form a locking ring 61 in the ampule body 51. The rubber seal is protected by a storage cover 54, against which the ampule body 51 is also blown. The mold half 83 contains an internal projection 84 which forms an access recess 63. When the ampule 50 is to be used, the user removes the label-seal 53 and grasps the free edge 55 of the storage cover 54, which free edge is accessible at the lower portion of access recess 63. The user then pulls storage cover 54 off, as indicated by 54' of FIG. 9. A sterile hypodermic needle 91 is then inserted through the puncture diaphragm area 57 of rubber seal 56, and through the breachable wall of the ampule body 51, to establish hydraulic connection between the hypodermic needle 91 and the liquid contents 52 of the ampule 50.

The ampule 50 can be tapped in a sterile manner a number of times, if the exterior of rubber seal 56 is resterilized before each tapping. The first tapping, however, can rely for sterility on the manufacturing process and the presence of storage cover 54 and label-seal 53. On the other hand it is contemplated that the ampule of both embodiments be a single unit dose.

FIG. 10 discloses a partly exploded view of a blow molding apparatus for manufacturing the ampule 10 of FIG. 1.

The axis 102 of the apparatus is established by the falling semimolten parison 101, which may come from a standard plastic extrusion machine, such as those which are conventionally used to extrude a parison or in blow molding operations. On either side of this axis are arranged a stack of matching mold halves, which are driven to meet, concentric with the axis 102, or which can be withdrawn to the position shown.

The mold halves 103, 110, and 120 are shown at the left in various drawn-back positions while only the lowermost one, 104, of the confronting other mold halves is shown in partly broken-away view.

Mold 103 is the ampule body mold; mold 110 is the ampule neck mold and sealing and cap producing mold; while mold 120 is the parison support mold.

Figure 11:
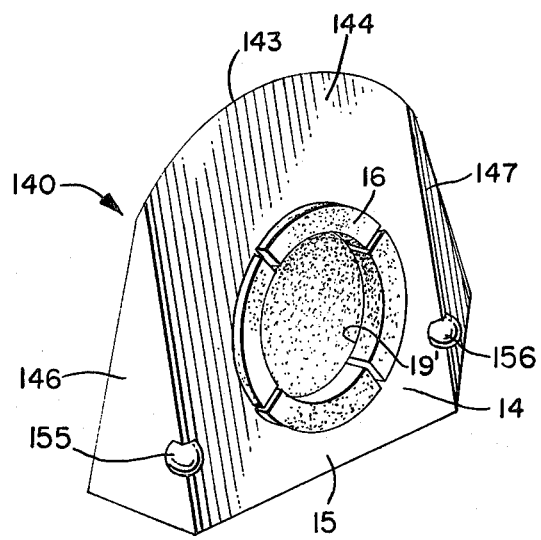
FIG. 11 is an enlarged perspective view of the needle puncture site assembly.

Shown seated in the cavity of body mold 103 is the needle puncture site assembly 140, which can be seen in greater cross sectional detail at the lower right of FIG. 2 and in enlarged perspective in FIG. 11.

The needle puncture site assembly is shaped so as to cooperate with the shape of the cavity of body mold 103 and with the shape of the growing parison, so that its final position, with respect to the ampule, is correct.

The bottom face of the assembly 140 is conical, fitting the bottom conical face of the cavity of body mold half 103. Furthermore, the back face of assembly 140 (in the position of FIG. 10) exactly fits the cylindrical contour of the cavity of the body mold 103. The combination of interfitting conical surfaces in a generally horizontal plane and interfitting cylindrical surfaces in a generally vertical plane provides very secure positioning. Furthermore, the remaining surfaces of assembly 140, which remaining surfaces are not supported by the mold, are generally slanted so as to be roughly parallel to the advance of the parison 101, when it is inflated by air. Accordingly, the growing parison 101 has little tendency to displace the assembly 140 during the making of the ampule. Instead, the growing parison 101 drives the assembly 140 more securely into the corner of the cavity of body mold 103.

In the above, it is contemplated that needle puncture site assembly 140 is manually or automatically positioned in body mold 103. In the preferred embodiment the needle puncture site assembly 140 is delivered to the mold half by means of a sliding bar 150 as seen in FIG. 10. The sliding bar moves perpendicularly through an opening 151 of the mold. The slide bar has a cut away portion 152 so that when it is in the position as seen in FIG. 10, the cut away portion of the slide bar forms a portion of the mold both a bottom portion, as well as a side cylindrical portion. The slide bar may be withdrawn and loaded with a needle puncture site assembly 140 when desired. The operation may be carried out whereby it is accomplished aseptically and the needle puncture site assembly is sterilized. When the slide bar is shown to be in the position shown in FIG. 10, the molds may be closed with the slide bar moving with the molds as they close.

The present concept may be satisfactorily employed for a plurality of molds machined into one elongated block. The slide bar would then be fabricated with a plurality of cut away portions, each one designed to come to rest in a respective mold cavity while carrying thereinto a needle puncture site assembly 140.

Figure 12A:
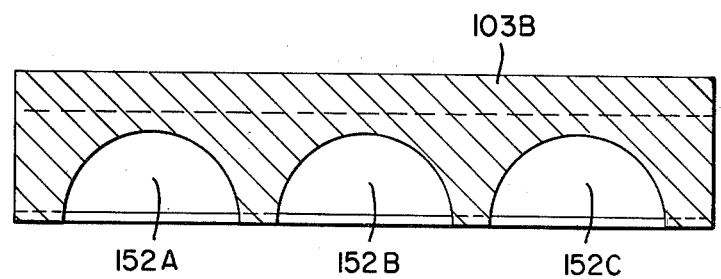
FIG. 12a is a cross-sectional view of one half of a mold having three cavities whereby three containers may be blown simultaneously.
Figure 12B:
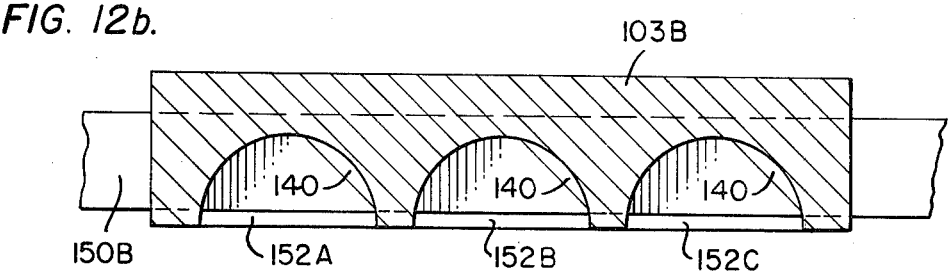
FIG. 12b is the same view as FIG. 12a with the carrier for the needle puncture site assembly in place.

As an aside with regard to the concept of providing a plurality of molds, attention is directed to FIGS. 12a and 12b. Also, it is believed that a better understanding will have been achieved from a consideration of the embodiment of the inventive concept shown by these figures. In FIG. 12a is a cross-section of a mold half 103B possessing a number of cavities 152A, 152B and 152C. Near the bottom portion of the mold half 103B is a channel shown somewhat by dotted lines from one side of the mold half to the other. The channel is designed to accept a slide bar having a plurality of cavities each with an injection site assembly 140 as can be clearly discerned from FIG. 12b.

When the parison 101 has been extruded, as shown by arrow E, so that its lower end has descended below the bottom of ampule body half molds 103 and 104, molds 103 and 104 advance towards axis 102, as shown by arrows A and A'. When molds 103 and 104 meet, the pinch-off edge 107 of molds 103 cooperates with a corresponding pinch-off edge of mold 104 to squeeze shut the bottom end of the parison 101 and pinch off excess flash and expel it through the relief offered by chamfer 106, as the face 108 of mold 103 meets the corresponding face of mold 104.

When body mold halves 103 and 104 have closed, the body of the ampule has incipiently been formed of parison 101.

The parison support mold halves 120 are closed simultaneously or at about this time, as shown by the arrow C. The cavity 122 roughly fits the outer diameter of parison 101 (which has a rather indefinite diameter in view of its semifluid nature). Parison support mold 120 is provided with vacuum lines 124 which cause parison 101 to stick to parison support mold 120, regardless of the indefinite shape of parison 101.

Since the parison 101 is now supported at mold surface 122, it can be cut off closely adjacent thereto.

The extrusion of the parison 101, the pinching-off at face 107, the supporting of parison 101 at support face 122 and the cutting off of parison 101 just above face 122 all occur at one work station located under the extrusion press outlet.

At the same time a blow-fill nozzle has entered the parison centrally thereof. This will establish a secure pneumatic connection between the nozzle and the inside of the parison. The ampule is blown by supplying pneumatic pressure, such as air, to the nozzle. The pneumatic pressure is applied before the seal-neck mold 110 closes and the parison is blown into the shape of the finished ampule, but joined to an unblown piece of the parison struck to support face 122. The pneumatic nozzle is then withdrawn, the filling, if any, occurs after blowing has essentially been completed.

After a suitable cooling operation of about 4 to 5 seconds, the ampule can be withdrawn, in a rigid condition, from the mold cavity. It will be hermetically sealed, may contain sterile liquid if filled during the foregoing step, and have an integral sterile needle puncture site assembly 140.

FIG. 11 shows the needle puncture assembly in greater detail. The intersection of the slanted flat face 144 and the cylindrical surface 143 provide a flush surface. Fingernail grasp 15 at the bottom is an undercut which provides means for removal of storage cover 14. The end faces 146 and 147 are angled so as to permit withdrawal of the storage cover from the ampule body 11, with a suitable frictional fit. The fingernail grasp permits a better lock of the storage cover 14 on the ampule body.

In the preferred embodiment the storage cover possesses at least two lugs 155 and 156 which protrude into two depressions formed from the parison during the blowing step. For a view of one depression for lug 156, see the cross section thereof in FIG. 2.

It should be reiterated that one of the important features of the present invention is the fact that the elastomeric seal does not come in contact with the contents in the container. The locking bubble 21 gives assurance of that fact. At the same time the magnitude of the plastic at the bubble is quite thin so that it may be readily penetrated either for injection purposes or aspiration purposes.

It will be noted from FIGS. 2 and 11 that the aforementioned rubber seal 16 has forwardly thereof a radially extending annular lip 157. As a result a portion of the blown parison engulfs the said lip to provide an annular locking portion 158, as can be seen from FIG. 2, for instance.

The container itself may be of the type disclosed in the prior art, such as having a neck portion with a breachable or penetrable seal or it may have a more conventional openable and closeable closure member. As the container is fabricated of thermoplastic material, the container may be fabricated with a sealed breakaway cap. The mold half 110 provides for just such an arrangement and moves in the direction shown by arrow B to provide the cap as seen in FIG. 1. The container may thereby be opened; filled through the thereby produced opening and resealed by pinching the opening together and then may be heat sealed.

Modifications and equivalents within the scope of the invention will readily be obvious to those skilled in the art. For example, a synthetic rubber may be used for the seal. The storage cover may be of the same elastomeric material as is the seal and the two items may be molded simultaneously and be held captive to each other by an integral connection hinge, the arrangement being similar to the common blow-up access valve of children's water toys. Furthermore, it is obvious that, if the elastomeric seal is made large and extended, the storage cover need cover only a portion of the elastomeric seal. That is, the storage cover need protect only the puncture diaphragm area and a reasonable safety factor area just beyond of the puncture diaphragm area.

What is claimed is:

1. A blow molded container comprising:
   a container of thermoplastic material;
   the interior of said container providing a body to provide a fill space for contents;
   an elastomeric seal fixedly locked during the blow molding process to the outside of said container body by interlocking undercuts on the abutting surfaces of said container body and elastomeric seal;
   a storage cover removably locked to the outside of said elastomeric seal by frictional engagement between the abutting surfaces of the elastomeric seal and the storage cover;
   the exposed surface of said container body and the exposed surface of said storage cover comprising parts of the outer periphery of the container;
   said outer periphery being in the form of a relatively flush surface.

2. The blow molded container of claim 1 wherein there is provided:

a relatively thin label-seal encompassing a portion of the girth of the said container body and extending over at least a portion of said storage cover;

means permanently fastening portions of said label-seal to said container;

whereby, in order to remove said storage cover, it is necessary to destroy at least part of said label-seal.

3. The blow molded container of claim 1 wherein:

said container body is of generally cylindrical shape, and said elastomeric seal is located in the cylindrical wall of said container body.

4. The blow molded container of claim 2 wherein:

said container body is of generally cylindrical shape, and said elastomeric seal is located so as to bridge the space between the cylindrical wall of said ampule body and an end wall of said container body.

5. The blow molded container of claim 1 wherein:

The storage cover has an acute edge at one of its most extended peripheries;

whereby the user can readily lift it up by prying up the acute edge.

6. The blow molded container of claim 1 wherein:

said container body is provided with a recessed contour, at a point immediately adjacent said storage cover;

thereby providing an access recess through which the adjacent edge of the storage cover can be reached and pried up.

7. A blow molded container comprising:

a hermetically sealed container of thermoplastic material;

the interior of said container providing a body to provide a fill space for contents;

an elastomeric seal fixedly locked during the blow molding process to the outside of said container body by interlocking undercuts on the abutting surfaces of said container body and the elastomeric seal;

a storage cover removably locked to the outside of said elastomeric seal by frictional engagement between the abutting surfaces of the elastomeric seal and the storage cover;

said storage cover extending beyond the periphery of said elastomeric seal and said storage cover being in intimate contact with said container body beyond said periphery;

the exposed surface of said container body and the exposed surface of said storage cover forming a large-scale smooth continuous surface with small-scale discontinuities at the transitions between said two exposed surfaces.

8. The blow molded container of claim 7 including:

a relatively thin label-seal encompassing a portion of the girth of the said container body and extending over at least a portion of said storage cover;

means permanently fastening portions of said label-seal to said container;

whereby, in order to remove said storage cover, it is necessary to destroy at least part of said label-seal.

9. The blow molded container of claim 7 wherein:

said container body is of generally cylindrical shape, and said elastomeric seal is located in the cylindrical wall of said ampule body.

10. Subject matter under claim 7 wherein:

said container body is of generally cylindrical shape, and said elastomeric seal is located so as to bridge the space between the cylindrical wall of said ampule body and an end wall of said container body.

11. The blow molded container of claim 7 wherein:

the storage cover has an acute edge at one of its most extended peripheries;

whereby the user can readily lift it up by prying up the acute edge.

12. The blow molded container of claim 7 wherein:

said container body is provided with a recessed contour, at a point immediately adjacent said storage cover;

thereby providing an access recess through which the adjacent edge of the storage cover can be reached and pried up.

* * * * *